US008204817B2

United States Patent
Pratt et al.

(10) Patent No.: US 8,204,817 B2
(45) Date of Patent: Jun. 19, 2012

(54) SYSTEM AND METHOD FOR PROVIDING ELECTRONIC PRICE FEEDS FOR TRADEABLE OBJECTS

(75) Inventors: Jeffrey Pratt, Chicago, IL (US); Kevin D. Kahley, Chicago, IL (US); Robert A. West, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 848 days.

(21) Appl. No.: 11/746,908

(22) Filed: May 10, 2007

(65) Prior Publication Data

US 2008/0281669 A1    Nov. 13, 2008

(51) Int. Cl.
    *G06Q 40/00* (2006.01)
(52) U.S. Cl. .......................................................... 705/37
(58) Field of Classification Search ...................... 705/37
    See application file for complete search history.

(56) References Cited

U.S. PATENT DOCUMENTS

| | | | |
|---|---|---|---|
| 5,987,432 A | 11/1999 | Zusman et al. | |
| 7,389,258 B2 | 6/2008 | Brumfield | |
| 7,389,264 B2 | 6/2008 | Kemp | |
| 2005/0228743 A1 | 10/2005 | Warsaw et al. | |
| 2006/0080215 A1* | 4/2006 | Warsaw et al. | 705/37 |
| 2006/0259412 A1 | 11/2006 | Kemp et al. | |
| 2006/0265316 A1 | 11/2006 | Brumfield et al. | |

FOREIGN PATENT DOCUMENTS

| | | |
|---|---|---|
| JP | 2002-056226 | 2/2002 |
| JP | 2004-178190 | 6/2004 |

OTHER PUBLICATIONS

International Search Report and Written Opinion for International Application No. PCT/US 08/62172.
International Preliminary Report on Patentability, mailed Nov. 10, 2009, for International Application No. PCT/US08/62172.
First Examination Report issued May 3, 2010 in Australian Application 2008251695 (2 pages).
Second Examination Report issued May 19, 2010 in Australian Application 2008251695 (2 pages).
English Language Translation of Examination Report issued May 2, 2011 in Chinese Application 200880014879.8 (4 pages).
Written Opinion issued Feb. 9, 2011 in Singapore Application 2009/06422 (5 pages).
Singapore Application No. 2009/06422, Examination Report issued Dec. 30, 2011 (6 pages).
English language translation of the Second Office Action received on Apr. 21, 2012 for corresponding Chinese application 2008800148798 (4 pages).
English language translation of Office Action mailed on Feb. 21, 2012 in Japanese Application 2010-507535 (1 page).
European Search Report Issued Mar. 23, 2012 in EPO Application 08747306 (6 pages).

* cited by examiner

*Primary Examiner* — Eric T Wong
(74) *Attorney, Agent, or Firm* — McDonnell Boehnen Hulbert & Berghoff LLP

(57) ABSTRACT

System and methods for a price feed generation are described. According to an example method described herein, upon receiving market information including a plurality of linear prices and order quantities, a reference price level is selected and a price feed message is generated to include the reference price level and the plurality of order quantities. The price feed message is then provided to client terminals.

21 Claims, 12 Drawing Sheets

| type | 48 | 3 | 1 | 1 | 0 | 0 | 0 | 3 | 1 | 0 | 1 | 0 | 0 | |
|---|---|---|---|---|---|---|---|---|---|---|---|---|---|---|
| | | 81 | | | | | | | | | | | | 612 |
| | | 64 | | | | | | | | | | | | 614 |
| | | 49 | | | | | | | | | | | | 616 |
| | | 89 | | | | | | | | | | | | 618 |
| | | 55 | | | | | | | | | | | | 620 |
| | | 34 | | | | | | | | | | | | 622 |
| | | 60 | | | | | | | | | | | | 624 |
| | | 80 | | | | | | | | | | | | 626 |
| | | 40 | | | | | | | | | | | | 628 |
| | | 10 | | | | | | | | | | | | 630 |

604, 608, 606, 610, 602

| version | b | 5 | size | | | | | | | sqn | | | | | | | | |
|---|---|---|---|---|---|---|---|---|---|---|---|---|---|---|---|---|---|---|
| type 314 | | | filter key 312 | | | | | | | | | | | | | | | |
| | | | length 316 | a size 318 | a1 320 | a2 322 | a3 324 | a4 326 | a5 328 | b size 330 | b1 332 | b2 334 | b3 336 | b4 338 | b5 340 | | | |
| | | | | ask qty 1 342 | | | | | | | | | | | | | | |
| | | | | ask qty 2 344 | | | | | | | | | | | | | | |
| | | | | ask qty 3 346 | | | | | | | | | | | | | | |
| | | | | ask qty 4 348 | | | | | | | | | | | | | | |
| | | | | ask qty 5 350 | | | | | | | | | | | | | | |
| | | | | bid qty 1 352 | | | | | | | | | | | | | | |
| | | | | bid qty 2 354 | | | | | | | | | | | | | | |
| | | | | bid qty 3 356 | | | | | | | | | | | | | | |
| | | | | bid qty 4 358 | | | | | | | | | | | | | | |
| | | | | bid qty 5 360 | | | | | | | | | | | | | | |
| | | | | ask price 1 362 | | | | | | | | | | | | | | |
| | | | | ask price 2 364 | | | | | | | | | | | | | | |
| | | | | ask price 3 366 | | | | | | | | | | | | | | |
| | | | | ask price 4 368 | | | | | | | | | | | | | | |
| | | | | ask price 5 370 | | | | | | | | | | | | | | |
| | | | | bid price 1 372 | | | | | | | | | | | | | | |
| | | | | bid price 2 374 | | | | | | | | | | | | | | |
| | | | | bid price 3 376 | | | | | | | | | | | | | | |
| | | | | bid price 4 378 | | | | | | | | | | | | | | |
| | | | | bid price 5 380 | | | | | | | | | | | | | | |

| Bid Qty | Prices | Ask Qty |
|---------|--------|---------|
|         | 60     | 81      |
| 89      | 50     |         |

FIG. 4B

| type | 16 | 1 | 1 | 0 | 0 | 0 | 0 | 1 | 0 | 0 | 0 | 0 | 0 | 0 |
|------|----|----|----|----|----|----|----|----|----|----|----|----|----|----|
| 81   |    |    |    |    |    |    |    |    |    |    |    |    |    |    |
| 89   |    |    |    |    |    |    |    |    |    |    |    |    |    |    |
| 60   |    |    |    |    |    |    |    |    |    |    |    |    |    |    |

| Bid Qty | Prices | Ask Qty |
|---------|--------|---------|
|         | 100    | 25      |
|         | 90     | 36      |
|         | 80     | 49      |
|         | 70     | 64      |
|         | 60     | 81      |
| 89      | 50     |         |
| 55      | 40     |         |
| 34      | 30     |         |
| 21      | 20     |         |
| 13      | 10     |         |

FIG. 5B

| type | 504 | 508 | | | | 506 | 510 | | | | 512 | 514 | 516 | 518 | 520 | 522 | 524 | 526 | 528 | 530 | 532 |
|------|-----|-----|---|---|---|-----|-----|---|---|---|-----|-----|-----|-----|-----|-----|-----|-----|-----|-----|-----|
| 48   | 5   | 1   | 0 | 0 | 0 | 0   | 5   | 0 | 0 | 0 | 0   |     |     |     |     |     |     |     |     |     |     |
|      | 81  |     |   |   |   |     |     |   |   |   |     |     |     |     |     |     |     |     |     |     |     |
|      | 64  |     |   |   |   |     |     |   |   |   |     |     |     |     |     |     |     |     |     |     |     |
|      | 49  |     |   |   |   |     |     |   |   |   |     |     |     |     |     |     |     |     |     |     |     |
|      | 36  |     |   |   |   |     |     |   |   |   |     |     |     |     |     |     |     |     |     |     |     |
|      | 25  |     |   |   |   |     |     |   |   |   |     |     |     |     |     |     |     |     |     |     |     |
|      | 89  |     |   |   |   |     |     |   |   |   |     |     |     |     |     |     |     |     |     |     |     |
|      | 55  |     |   |   |   |     |     |   |   |   |     |     |     |     |     |     |     |     |     |     |     |
|      | 34  |     |   |   |   |     |     |   |   |   |     |     |     |     |     |     |     |     |     |     |     |
|      | 21  |     |   |   |   |     |     |   |   |   |     |     |     |     |     |     |     |     |     |     |     |
|      | 13  |     |   |   |   |     |     |   |   |   |     |     |     |     |     |     |     |     |     |     |     |
|      | 60  |     |   |   |   |     |     |   |   |   |     |     |     |     |     |     |     |     |     |     |     |

| Bid Qty | Prices | Ask Qty |
|---------|--------|---------|
|         | 90     | 49      |
|         | 80     | 64      |
|         | 70     |         |
|         | 60     | 81      |
|         | 50     |         |
| 89      | 40     |         |
| 55      | 30     |         |
|         | 20     |         |
| 34      | 10     |         |

FIG. 6B

| type | 3 | 1 | 1 | 0 | 0 | 3 | 1 | 0 | 1 | 0 | 0 |
|------|---|---|---|---|---|---|---|---|---|---|---|
| 48   | 81 | 64 | 49 | 89 | 55 | 34 | 60 | 80 | 40 | 10 |   |

| type 702 | length 704 | Depth 706 | b1 | b2 | b3 | b4 | b5 | b6 | b7 | b8 |
|---|---|---|---|---|---|---|---|---|---|---|
| | | price 1 710 | | | | | | | | |
| | | qty 1 712 | | | | | | | | |
| | | price 2 (optional) 714 | | | | | | | | |
| | | qty 2 716 | | | | | | | | |
| | | price 3 (optional) 718 | | | | | | | | |
| | | qty 3 720 | | | | | | | | |
| | | price 4 (optional) 722 | | | | | | | | |
| | | qty 4 724 | | | | | | | | |
| | | price 5 (optional) 726 | | | | | | | | |
| | | qty 5 728 | | | | | | | | |
| | | price 6 (optional) 730 | | | | | | | | |
| | | qty 6 732 | | | | | | | | |
| | | price 7 (optional) 734 | | | | | | | | |
| | | qty 7 736 | | | | | | | | |
| | | price 8 (optional) 738 | | | | | | | | |
| | | qty 8 740 | | | | | | | | |
| | | price 9 (optional) 742 | | | | | | | | |
| | | qty 9 744 | | | | | | | | |

| Bid Qty | Price | Ask Qty |
|---------|-------|---------|
|         | 12190 | 49      |
|         | 12180 | 64      |
|         | 12170 |         |
|         | 12160 | 81      |
|         | 12150 |         |
| 89      | 12140 |         |
| 55      | 12130 |         |
|         | 12120 |         |
| 34      | 12110 |         |

FIG. 11B

| type | 1112 | 1114 | 1116 | 1118 | 1120 | 1122 | 1124 | 1126 | 1128 | 1130 |
|------|------|------|------|------|------|------|------|------|------|------|
| 3    | 1    | 1    | 0    | 0    | 0    | 3    | 1    | 0    | 1    | 0    |
|      | 81   |      |      |      |      |      |      |      |      |      |
|      | 64   |      |      |      |      |      |      |      |      |      |
|      | 49   |      |      |      |      |      |      |      |      |      |
|      | 89   |      |      |      |      |      |      |      |      |      |
|      | 55   |      |      |      |      |      |      |      |      |      |
|      | 34   |      |      |      |      |      |      |      |      |      |
|      | 12160|      |      |      |      |      |      |      |      |      |
|      | 20   |      |      |      |      |      |      |      |      |      |
|      | 20   |      |      |      |      |      |      |      |      |      |
|      | 20   |      |      |      |      |      |      |      |      |      |

SYSTEM AND METHOD FOR PROVIDING ELECTRONIC PRICE FEEDS FOR TRADEABLE OBJECTS

TECHNICAL FIELD

The present invention is directed towards electronic trading. More specifically, the present invention is directed to tools for providing improved price feeds in an electronic trading environment.

BACKGROUND

Electronic trading is generally based on a host exchange, one or more computer networks, and client devices. Subscribing traders are connected to an exchange's electronic trading platform by way of communication links to facilitate real-time electronic messaging between themselves and the exchanges. The electronic trading platform includes at least one electronic market, which is at the center of the trading system and handles the matching of bids and offers placed by the traders for that market. The electronic messaging includes market information that is distributed from the electronic market to the traders via an electronic data feed. Once the traders receive the market information, it may be displayed to them on their trading screens. Upon viewing the information, traders can take certain actions including the actions of sending buy or sell orders to the electronic market, adjusting existing orders, deleting orders, or otherwise managing orders. Traders may also use software tools on their client devices to automate these and additional actions.

Although the types of market information published by an electronic exchange may differ from market to market, there are generally some standard pieces of information. Market information may include data that represents just the inside market. The inside market is the lowest available ask price (best ask) and the highest available bid price (best bid) in the market for a particular tradeable object at a particular point in time. Market information may also include market depth. Market depth refers to quantities available at the inside market and may also refer to quantities available at other prices away from the inside market. In addition to providing order book information, such as order price and quantity information, electronic exchanges can offer other types of market information such as the open price, settlement price, net change, volume, last traded price, the last traded quantity, and order fill information.

Electronic exchanges and/or intermediary devices, such as gateways, often struggle to balance the amount and timeliness of market information with the bandwidth limitations and reliability of the networks to deliver data intensive, fast response market data feeds. On one hand, a tremendous amount of market information may be generated by an electronic market to adequately characterize a given market, especially when changes in the market are happening at a rapid rate. Often, traders want to access as much of this information as possible so that they can make better-informed trades. On the other hand, limitations on the amount of market information passed to the traders are often inherent in the design of physical networks that connect traders to the electronic market.

Generally, there are two models how electronic markets deliver market information to client devices. In addition, slight variations of the two models are sometimes used.

The first model that is most commonly used to deliver market depth is a delta based model. The delta based model involves sending incremental updates every time the inside market or market depth changes in an order book. In the delta based data delivery environment, a client terminal initially receives a snapshot of current market conditions listing each price level and quantities pending at the price levels. As changes in the market are detected, such as when a quantity at a certain price level increases, a market update is sent to the client terminal to indicate the incremental change in the quantity.

Many currently existing networks use multicast to deliver delta based price data to client terminals. As known in the art, multicast refers to the delivery of information to many receivers at the same time in a single stream. Sending delta-based data over multicast, however, requires implementation of application level reliability to guarantee that all packets are received at a client terminal. If the client terminal detects a missing update, such as based on a sequence number included in each received update, the client terminal will re-request the missing update to correctly use the information in the next update, thus introducing delays and resulting in processing overhead. To overcome the reliability problems of networks using multicast, price data may be sent via a point-to-point network connection created for each client terminal. However, the use of point-to-point connections in trading environments that include a large number of client terminals is undesirable because a price server has to send each update separately to each interested client terminal, thus resulting in an inefficient use of bandwidth and producing delays at the server.

The second data delivery model that is often used involves sending a snapshot update at pre-programmed intervals, such as time-based intervals or event-based intervals. A snapshot update is a message that contains market information such as an inside market and market depth with actual prices and quantities listed in relation to each price included in the update. Sending the entire depth snapshot has historically been considered unrealistic due to the bandwidth considerations and packet size.

It would therefore be beneficial to provide a method and system for an improved data distribution that is readily adaptable to communicating market information in a more dynamic way.

BRIEF DESCRIPTION OF THE DRAWINGS

Example embodiments are described herein with reference to the following drawings, in which:

FIG. 3 is a block diagram illustrating an example format of a message that is used to send price and quantity data according to one example embodiment;

FIGS. 4A and 4B illustrate an example one level of market depth and a message format generated for the example depth;

FIGS. 5A and 5B illustrate an example market depth and a message that is generated to convey multiple levels of market depth according to the example embodiment described herein;

FIGS. 6A and 6B illustrate an example market depth of a non-linear market and an example market update message generated for such a market;

FIG. 7 is a block diagram illustrating an alternative message format that can be used to send price and quantity data according to one example embodiment;

FIGS. 11A and 11B illustrate an example market depth of a non-linear market and an example market update message generated for such a market using a delta delivery method using the message format of FIG. 3;

SUMMARY

According to example embodiments described herein, system and methods are provided for providing market data in an electronic trading environment. To illustrate the present invention and aspects thereof, the following description, including the figures and detailed description, provides examples that can be used or readily modified by one of ordinary skill to generate a system or method that benefits from the teachings described and claimed herein.

According to one example method, market information comprising a plurality of price levels and a plurality of order quantities are received for a tradeable object. Upon receiving market information, a determination is made if the plurality of price levels are linear. If the plurality of price levels are linear, a reference price level is selected, and a price feed message is generated to include the reference price level along with the plurality of order quantities. The price feed message is then sent to client terminals. If the plurality of price levels include non-linear price levels, a price feed message further includes non-linear price levels. Additionally, the price feed message may include a plurality of mapping indicators to indicate market depth levels for which price levels are included in the price feed message.

Other features of the present invention will become more apparent to persons having ordinary skill in the art to which the present invention pertains from the following description and claims.

DETAILED DESCRIPTION

The present invention is related to generating and providing new market data feeds, or more specifically to a price data feed that, among other things, can reduce processing, bandwidth and reliability problems. The present invention is applied in an electronic trading network environment, but could be also applied in other network environments as well. A trading network environment is one that distributes time sensitive data to receiving computers, such as price data. While the description will focus on delivery of prices, the example embodiments may be equally applied to delivery of other data. To illustrate aspects of the present invention, a system and method are illustrated in example form using the drawings referred to herein. One of ordinary skill in the art will recognize, however, that such examples may be quickly and readily adaptable using the teachings described herein. Aspects of the present invention are protected by the accompanying claims. Limitations from the patent specification should not be improperly incorporated into the claims unless explicitly stated or otherwise inherently known.

I. Example Trading System Configuration

Figure 1:
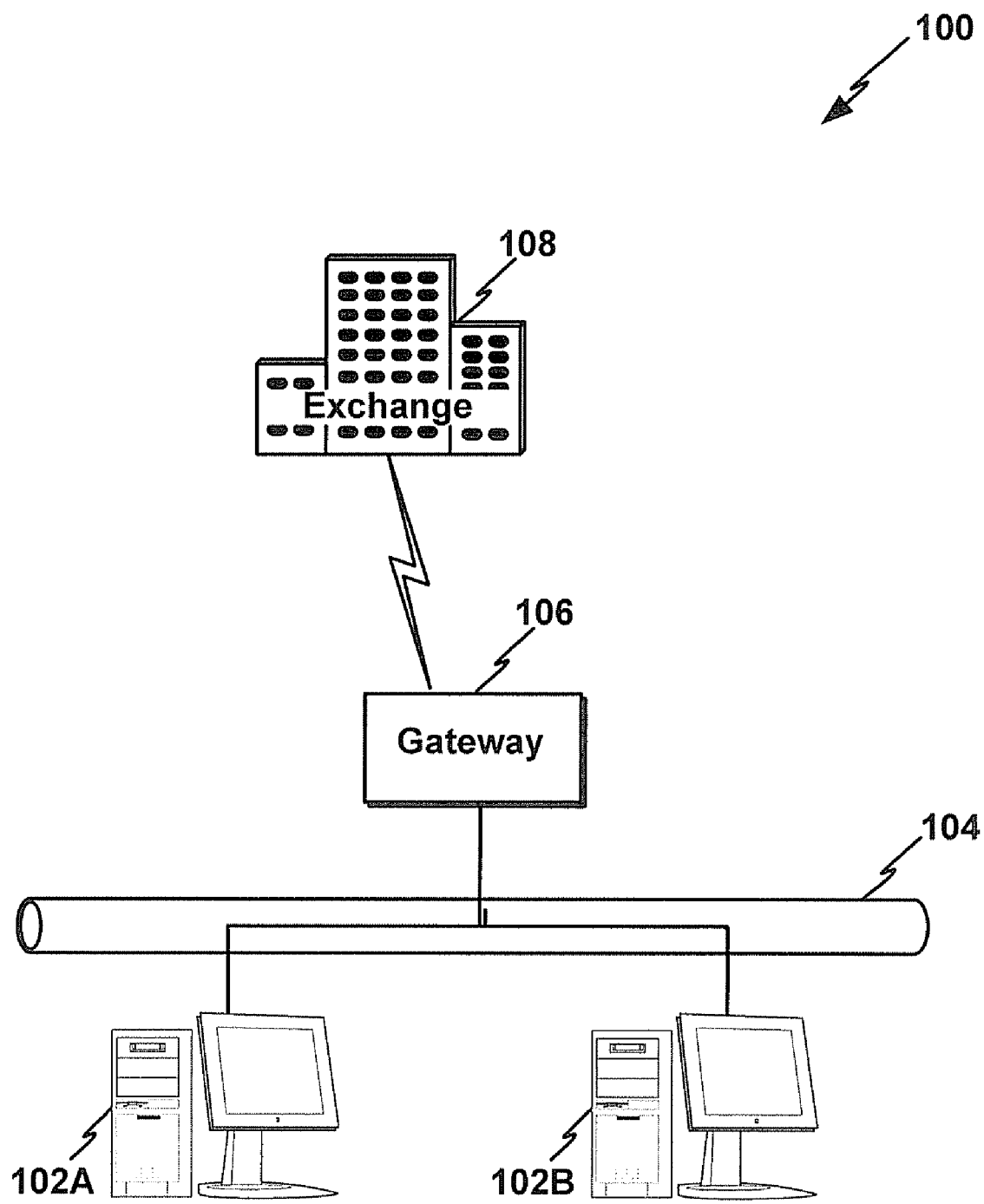
FIG. 1 is a block diagram illustrating an example electronic trading system in which a client terminal and a gateway device are on a local area network.

FIG. 1 illustrates an example electronic trading system 100 in which the example embodiments may be employed. The example system 100 comprises trading stations 102A and 102B that access an electronic exchange 108 through a gateway 106. As illustrated in FIG. 1, the trading stations 102A-B and the gateway 106 are located within a local LAN 104, although other configurations are possible, such as the trading stations 102A-B communicating with the gateway 106 through a remote host in a remote network configuration environment. While not shown, a router could be used to route messages between the gateway 106 and the electronic exchange 108. The electronic exchange 108 includes a computer process (e.g., the central computer) that matches buy and sell orders sent from the trading stations 102A-B with orders from other trading stations (not shown). The electronic exchange 108 may list one or more tradeable objects for trading. While not shown in FIG. 1 for the sake of clarity, the trading system may include other devices that are specific to the client site like middleware and security measures like firewalls, hubs, security managers, and so on, as understood by persons skilled in the art.

Regardless of the types of order execution algorithms used, the electronic exchange 108 provides market information to the subscribing trading stations 102A-B. Market information includes price data for one or more tradeable objects. Price data might include the inside market, which is the best bid and the best ask price currently available for a tradeable object, the last traded price, and other prices for which there is quantity pending in the market. Price data may include other items of interest, or include only certain pieces of information. While the example embodiments are described herein as distributing price data, other types of information can be distributed in an electronic trading environment.

The computer employed as the trading stations 102A-B generally can range from a hand-held device, laptop, or personal computer to a larger computer such as a workstation and multiprocessor. An illustrative personal computer may use Pentium™ microprocessors and may operate under a Windows operating system, or yet may use some other microprocessor or operating system. Generally, the trading stations 102A-B includes a monitor (or any other output device) and an input device, such as a keyboard and/or a two or three-button mouse to support click based trading, if so desired. One skilled in the art of computer systems will understand that the present example embodiments are not limited to any particular class or model of computer employed for the trading stations 102A-B and will be able to select an appropriate system.

In one example embodiment, the trading stations 102A-B use software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, a trading station could run automated types of trading applications.

The example embodiment may be implemented in relation to any type of trading screen, therefore, details regarding the trading screen are not necessary to understand the present invention. However, in one embodiment, one type of trading screen that can be used is provided by a commercially available trading application referred to as X_TRADER® from Trading Technologies International, Inc. of Chicago, Ill. X_TRADER® also provides an electronic trading interface, referred to as MD Trader™, in which working orders and/or bid and ask quantities are displayed in association with a static price axis or scale.

Portions of the X_TRADER® and the MD Trader™-style display are described in U.S. Pat. No. 6,772,132, entitled "Click Based Trading With Intuitive Grid Display of Market Depth," filed on Jun. 9, 2000, U.S. Pat. No. 6,938,011, entitled "Click Based Trading with Market Depth Display" filed on Jun. 9, 2000, U.S. Pat. No. 7,127,424 entitled "Click Based Trading With Intuitive Grid Display of Market Depth and Price Consolidation," filed on Oct. 5, 2001, U.S. patent application Ser. No. 10/125,894, entitled "Trading Tools For Electronic Trading," filed on Apr. 19, 2002, and U.S. patent application Ser. No. 10/376,417, entitled "A System and Method for Trading and Displaying Market Information in an Electronic Trading Environment," filed on Feb. 28, 2003, the contents of each are incorporated herein by reference. However, it should be understood that orders in the system illustrated in FIGS. 1 and 2 could also be placed using any other trading application as well. Additionally, the preferred embodiments are not limited to any particular product that performs translation, storage, and display function.

The computer employed as the gateway 106 generally can range from a personal computer to a larger or faster computer. An illustrative gateway computer may use Pentium™ microprocessors and may operate under a Windows (server or workstation) operating system, or yet some other system. Generally, the gateway 106 additionally includes a monitor (or any other output device), input device, and access to a database, if so desired. One skilled in the art of computer systems will also understand that the present example embodiments are not limited to any particular class or model of computer(s) employed for the gateway 106 and will be able to select an appropriate system. Additionally, in some instances, a gateway, such as gateway 106, may not even be necessary and/or another type of network intermediary device may be employed.

It should be noted that computer systems that are employed here as a trading station or a gateway generally includes a central processing unit, a memory (a primary and/or secondary memory unit), an input interface for receiving data from a communication network, an input interface for receiving input signals from one or more input devices (for example, a keyboard, mouse, etc.), and an output interface for communications with an output device (for example, a monitor). A system bus or an equivalent system may provide communications between these various elements.

Memory on either the gateway 106 or the trading station 102 includes a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, any other physical medium, memory chip or cartridge, or any other medium from which a computer can read.

It should also be noted that the trading stations 102A-B generally execute application programs resident at the trading stations 102A-B under the control of the operating system of the trading station. Also, the gateway 106 executes application programs resident at the gateway 106 under the control of the operating system of the gateway 106. In other embodiments and as understood by a person skilled in the art, the function of the application programs at the trading stations 102A-B may be performed by the gateway 106, and likewise, the function of the application programs at the gateway 106 may be performed by the trading stations 102A-B.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example, the gateway device may be located at the client site along with the trading station, which is usually remote from the matching process at the electronic exchange. According to another example, the gateway device may be located at the exchange side. As such, the present invention is not limited to any actual network configuration.

According to the illustrated embodiment, the trading stations 102A-B, the gateway 106, and any routers communicate over the LAN 104, and the gateway 106 may communicate with the matching process at the electronic exchange 108 over a T1, T3, ISDN, or some other high speed connection. In another example illustration, the client site may be located on the actual grounds of the electronic exchange (for example, in the building of the exchange). According to this instance, the trading station and the gateway may still communicate over a LAN, but if any routers are used, they may communicate with the matching process at the electronic exchange through another connection means besides a T1, T3, or ISDN. In yet another example illustration, the gateway may be housed at, or near, its corresponding electronic exchange. According to this instance, the trading station may communicate with the gateway over a wide area network or through the use of a T1, T3, ISDN, or some other high speed connection.

While a single exchange is shown in FIG. 1, it is understood that a trader may obtain access and trade at multiple electronic exchanges. In such an embodiment, a client terminal could access multiple exchanges through multiple gateways, with each gateway designated for a specific exchange. Alternatively, a single gateway may be programmed to handle more than one electronic exchange.

It could be very valuable to provide a trader with the opportunity to trade tradeable objects listed at different electronic exchanges. For example, a trader could view market information from each tradeable object through one common visual display. As such, price and quantity information from the two separate exchanges may be presented together so that the trader can view both markets simultaneously in the same window. In another example, a trader can spread-trade different tradeable objects listed at the different electronic exchanges. Regardless, the present invention is not so limited.

II. Example System Configuration

Figure 2:
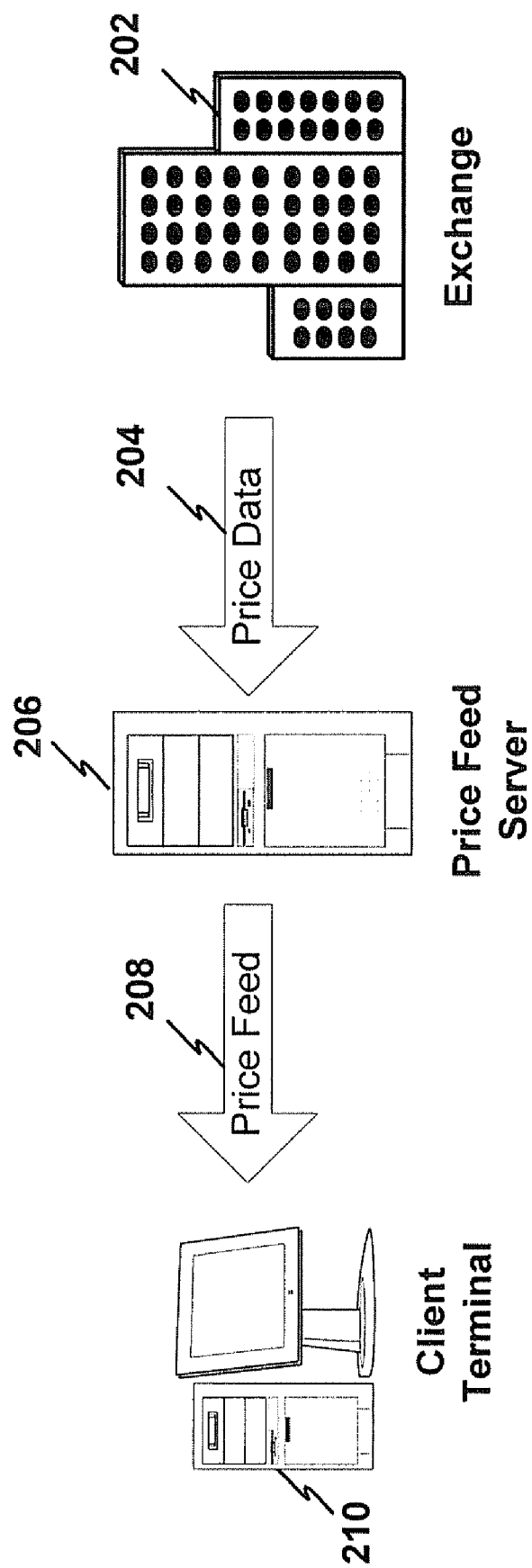
FIG. 2 is a block diagram illustrating an example system for delivery of new and improved price feeds according to one example embodiment.

FIG. 2 is a block diagram illustrating an example system 200 for delivery of new and improved price feeds according to one example embodiment. The example system 200 includes an exchange 202 that provides price data 204 to a price feed server 206. The price feed server 206 processes the received price data 204 to generate a new and improved price feed 208 that will be described in greater detail below. The price feed 208 is then provided to a client terminal 210.

While not specifically shown, it should be understood that the price feed server 206 may be located at the exchange 202. Alternatively, the price feed server 206 may be located at a gateway. Further alternatively, the price feed server 206 may be a free standing entity in communication with the exchange 202 and a gateway. Additionally, while only a single client terminal is shown for purposes of illustration, it should be understood that the price feed server 206 may communicate the price feed 208 to multiple client terminals via multicast or via some other communication methods currently known or later developed.

III. Example Price Data Feed Generation

The existing price delivery methods suffer many limitations, and the most often used delta based market data delivery requires a high level of network reliability that results in incurring unnecessary memory, bandwidth and processing resource consumption for fast moving markets. The proposed new price feeds, among other benefits, solve these problems.

Depth prices of a typical tradeable object are related by a tick size that corresponds to the smallest allowed price increment between the consecutive prices. For fast moving, high volume markets, prices usually have a linear relationship between their relative positions in the market. In other words, in most cases depth prices are one tick off from the prices at the neighboring price levels. For example, a set of bid prices of {50, 40, 30, 20, 10} having a tick size of 10, and a set of ask prices of {60, 70, 80, 90, 100, 110} also having a tick size of 10, have a linear relationship since all prices are at a single tick offset. Aspects of the example price feeds described herein utilize on this linearity attribute of the price levels by providing a single reference price level and a plurality of quantity values, with other prices derived for each quantity specified in a price update based on the relative position of each price in relation to the reference price.

While markets tend to be linear, sometimes they may experience non-linearity, such as when, for example, a set of prices on either a bid side or an ask side is {60, 70, 90, 100, 110}. The market in this example is considered non-linear because not all price levels are at a single tick offset, such as the second price level '70' and the third price level '90' are off by 2 ticks. According to the example embodiments for a new price feed, in addition to providing a reference price level, prices where the non-linearity is introduced will be sent in a price update message. In either the linear or non-linear markets, eliminating the need to send a number of price levels in a price update message results in a highly efficient compressed price feeds while the processing of the compressed updates at the client terminals involves addition and subtraction operations of a known value.

The examples that follow will illustrate a number of price feed messages according to the example embodiments. The majority of examples that follow illustrate a message format for providing an aggregate quantity value at each price level. However, it should be understood that more than one quantity value could be defined in relation to each price level when a system is configured to provide individual quantity values corresponding to each order that is pending at a price level. A message format for providing detailed quantity values at each price level will be illustrated as well.

FIG. 3 is a block diagram illustrating an example format of a message 300 that is used to send price and aggregate quantity data according to one example embodiment.

The example message 300 includes a number of packet header fields. The packet header fields include a version field 302, a block identifier field 304, a snapshot identifier field 306, a size field 308, a sequence number "sqn" field 310, and a filter key field 312. The version field 302 defines a protocol version identifier that is used to create the message 300. The protocol version identifier may be used at client terminals that receive the message 300 to decode the message using the specified version of the protocol that was used to create the message. The block identifier field 304 defines whether quantity, price, or other data blocks are included in the message. The snapshot identifier field 306 defines whether a snapshot data delivery is used in the message. If the snapshot identifier field 306 is not set, different types of market delivery could be used as well. While the example embodiments will focus on the snapshot based market data delivery model, it should be understood that the message 300 could include additional fields defining other market delivery types, such as a delta delivery model, a combination of snapshot and delta delivery models, or yet some other models.

Referring back to the message 300, a size field 308 defines a size of the message in bytes. According to one example embodiment, a maximum packet size could be defined, such as, for example, 1024 bytes. A sequence field 310 identifies a counter value that is incremented each time a message is sent to client terminals. The incremented counter value specified in the message 300 may be used at the client terminals to detect packet loss. According to one example embodiment, if the packet loss exceeds a predefined threshold, a client terminal may transmit a re-send request for a specific update to a price feed server. Finally, a filter key field 312 in the header of the message 300 includes a 32-bit cyclic redundancy check ("CRC") generated based on the concatenation of an exchange name, a symbol of a tradeable object, as well as a series name and a series key that uniquely identify a given tradeable object. According to one example embodiment, the filter key is generated to form a unique value so that the filter key may be used to filter unwanted data at client terminals or other network entities.

Next, the message 300 includes a block header with a type field 314, a length field 316, and a number of block specific fields, here illustrated at 318-340. The type field 314 defines the block type included in the message 300. According to one example embodiment, there could be many different block types including a security ID that uniquely identifies a given tradeable object, tick data defining how prices are represented, depth, implied depth, trade data such as last traded price/quantity, session data such as a highest/lowest traded price, theoretical market, direct market, indicative market, implied from implied market, market prices, and transitional trading states for a given tradeable object, such open, closed, etc. According to one example embodiment, different binary identifiers could be used to define the illustrative data types. For example, "0" through "11" could be used to represent each of the example block types, with "0" corresponding to the security ID type, "1" corresponding to the tick block type, and so on. It should be understood that the illustrated types are only examples, and different data types could be provided as well using the methods described herein.

Next, assuming that the block type is set to depth prices, implied prices, theoretical prices, indicative prices, direct prices, or yet some other prices that can be calculated based on market data, fields 318-340 are used as shown in the message 300. The 'a size' field 318 defines a number of asks that are sent in the message 300. According to one example embodiment, a maximum number of asks may be defined to limit the number of ask levels that are provided to a client terminal in the message 300. In the example provided in FIG. 3, the message 300 includes five ask levels with ask fields 'a1-a5' shown at 320-328. According to one example embodiment, the ask fields 320-328 are a bitmap indicating which ask prices are non-linear. If a bit is set in any of the ask fields, the corresponding price is transferred, as will be illustrated in greater detail below using specific examples. If a bit is clear, then the corresponding price is assumed to be one tick better/worse than the previous price level and is not transferred. Rather, a client terminal receiving the message 300 may use the specified bitmaps to determine a price level corresponding to each quantity specified in the message 300. Additionally, according to one example embodiment, a bit in the 'a1' field 320 is preferably set if the ask size is greater than zero.

Similarly to ask related information provided in the message 300, the 'b size' field indicates the number of bids working that are sent in the message 300, with bid fields shown at 332-340. Similarly to the ask fields, the bid fields 332-340 are used to indicate which bid prices are non-linear. According to one example embodiment, the bid field 332 is set if the ask size is set to "0," and the bid size is greater than "0." If "b1" field is clear and the bid size is greater than "0," the bid price is one tick worse than the ask price corresponding to "a1." If a bit is set in any of the bid fields, the corresponding price is transferred. Then, if a bit is clear, the corresponding price is assumed to be one tick better/worse than the previous price, and the price is not transferred.

The message 300 also includes a number of ask quantity blocks, "ask qty 1-ask qty 5" shown at 342-350, bid quantity blocks, "bid qty 1-bid qty 5" shown at 352-360, ask price blocks, "ask price 1-ask price 5" shown at 362-370, and finally bid price blocks, "bid price 1-bid price 5" shown at 372-380. According to one example embodiment, the number of ask quantities that are transferred in the message 300 is equal to the ask size specified in the 'a size' field 318, and the number of bid side quantities reflects the number in the 'b size' field 330. While five quantity blocks are shown for the bid side and the ask side in the message 300, it should be understood that, depending on the system configuration, a different number of bid and ask levels could be transferred as well.

Now, referring to the ask/bid price blocks, the number of prices that are transferred is equal to the number of bits set in 'a1-a5' and 'b1-b5' at 320-328 and 332-340. According to one example embodiment, a single reference price is transferred, and other prices in linear markets are not transferred but rather a client terminal determines the prices not provided in an update based on the known linear characteristic associated with other prices in a given market. For example, the reference price may be set to the best ask or best bid price. However, it should be understood that the reference price could be set to different prices as well. In the example where the best ask is the reference price and other ask prices are linear, the best ask price would be transferred in the 'ask price 1' block and no other ask prices would be transferred in the message 300. According to one example embodiment, if there are no prices working in the market, only a block header may be sent to client terminals, with the ask and bid size fields zeroed out to indicate that all quantities and prices are equal to zero, or are not sent.

The embodiments described above for generation and delivery of new data feeds will be illustrated hereinafter using specific examples. It should be understood that the examples are only illustrations, and different variations or modifications of the examples given below are possible as well.

A. One Level of Depth Example

While multiple levels of depth are typically sent to client terminals, one level of depth may occasionally be sent. According to one example embodiment, one level of depth may be sent for indicative, direct, or second generation implied prices, as well as theoretical prices, when such prices are provided by an exchange. Additionally, one level of depth may be provided when a client terminal subscribes to receive only inside market data.

FIGS. 4A and 4B illustrate an example one level of depth 400 and a message format 402 generated for the example depth 400. According to the example embodiment illustrated in FIG. 4A, the inside market includes a bid quantity of '89' at a best bid price level of '50' along with an ask quantity of '81' at a best ask price level of '60.' As shown in the message 402 illustrated in FIG. 4B, ask and bid size fields 404 and 406 are both set to '1' to indicate a single bid and ask being sent in the message 402. Then, since the best ask price is used as a reference price in the message, the first field in the ask bitmap 408 is set to '1,' with other fields in the ask bitmap 408 and a bid bitmap 410 set to '0.' Based on the message configuration shown in FIG. 3, the message 402 defines the ask quantity of '81' in a field 412, a bid quantity of '89' in a field of 414, and a reference ask price level of 60 in a field of 416.

B. Five Levels of Depth Example-Linear Market

In most trading environments, multiple market depth levels are provided to client terminals. FIGS. 5A and 5B illustrate an example market data set 500 and a message 502 that is generated to convey the market data according to the example embodiment described herein. Referring to FIG. 5A, the market data 500 includes five ask price levels and five bid price levels with the corresponding quantities. Since there are five bids and five asks in the illustrated market data 500, an ask size field 504 and a bid size field 506 are both set to '5.' All prices of the market data 500 are one tick off from each other, with a tick size of '10,' thus the market data is linear. Using the example provided above with the best ask price being used as a reference price in a message update, and with the linear price characteristics of the market data 500, the message 502 illustrates only a single bit set in the first field of an ask bitmap 508, with other bits being set to '0' in the ask bitmap 508 as well as a bid bitmap 510.

Referring now to block fields of the message 502, the first five blocks 512-520 include five ask quantity levels, with a first ask quantity block 512 listing a quantity that corresponds to the best ask price, a second ask quantity block 514 listing a quantity at the next ask price level and so on. Then, the next five blocks 522-532 include five bid quantity levels, with the first bid quantity block 522 listing a quantity at the best bid price, a second bid quantity block 524 listing a quantity at the next bid price level and so on. As mentioned earlier and illustrated in the bitmap 508, the best ask price is used as a reference price and thus is included in a block 532. Because other prices share linear characteristics, no other prices are included in the message 502.

C. Five Levels of Depth Example-Non-Linear Market

As explained earlier, while most active, fast-moving markets are linear, some markets may occasionally experience non-linear characteristics. FIGS. 6A and 6B illustrate an example market data set 600 of a non-linear market and an example market update message 602 generated for such a market. In the illustrated market data set 600, ask prices are '60,' '80,' and '90,' and bid prices are '40,' '30,' and '10.' No quantities are pending at the remaining prices of '70,' '50,' and '20.' Since no quantities are pending at the three price levels, such prices are not sent according to one example embodiment described herein. Because there are three ask and bid price levels at which there are pending quantities, ask and bid size fields 604 and 606 in the message 602 indicate '3.'

Now, looking at an ask bitmap 608 of '1 1 0 0 0,' the first bit is set to '1' to indicate that the best ask price will be transferred, here the ask price level of '60.' Then, the second bit is set to indicate that the second best ask price will be transferred as well, here the ask price of '80.' Since all other bits in the ask bitmap are set to '0,' no additional ask prices are transferred, thus indicating that other prices corresponding to quantities included in the message 602 are all linear.

Referring now to block fields of the message 602, the first three blocks 612-616 include three ask quantity levels, with the first ask quantity block 612 listing a quantity that corresponds to the best ask price, the second ask quantity block 614 listing a quantity at the next ask price level, here at the price level of '80,' and the third ask quantity block 616 listing a quantity at the next ask price level of '90.' Then, the next three blocks 618-622 include three bid quantity levels corresponding to the bid price levels of '40,' '30,' and '10,' respectively. Finally, based on the bitmaps explained above, in addition to the reference price set to the best ask price that is transferred in a block 624, a non-linear ask price is provided in a block 626, along with two non-linear bid price levels in blocks 628 and 630.

D. Alternative Message Format

FIG. 7 is a block diagram illustrating an alternative message block format 700 according to another example embodiment. According to the embodiment illustrated in FIG. 7, bids and asks are specified in different message blocks; however, the blocks can be combined into a single message. For example, an example message may include a bid depth block, an ask depth block, an implied bid depth block, an implied ask depth block, etc., examples of which will be described in greater detail below.

Referring to FIG. 7, the message 700 includes a header with a type field 702, a length field 704, a size field 706, and a bitmap field 708. Similarly to the messages illustrated above, the type field 702 is a block identifier that defines a type of data specified in the message block 700. Example message block types include a direct market bid/ask depth, a direct market ask depth, an implied market bid depth, an implied market ask depth, a detailed bid depth, a detailed ask depth, a last traded price/quantity, etc. The length field 704 defines a length of the packet payload in bytes. The depth size field 706 specifies the number of market data entries. Then, the bitmap field 708 defines whether or not a specific price is sent in the message block. In the embodiment illustrated in FIG. 7, each price field is followed by a quantity field defining a quantity that is pending at a price level corresponding to the proceeding price field. Similarly to the embodiments described earlier, only a reference price is sent in a message block and then non-linear prices are defined based on bits specified in the bitmap 708. While 8 bits are specified in the bitmap 708, it should be understood that fewer or more bits could be used as well to illustrate fewer or more price levels. In the embodiment illustrated in FIG. 7, every 8 price level/quantity combination pairs, another bitmap is defined, such as a bitmap 742, which corresponds to the data that is specified following the bitmap 742.

Similarly to the examples given above, when writing and reading the message block of FIG. 7, the value that is used to infer a price that is not written is based on the type of data being read/written. For direct and implied ask market depth, if a price is not written, the offset that is applied to the previous value is set to '1,' or yet some other value depending on the tick definitions specified for a given tradeable object. Similarly to the examples given above, the lowest ask price may be used as a reference price. Then, for direct and implied market bid depth, the offset is set to '−1.' If detailed depth is provided, such as when multiple quantity values corresponding to pending orders are specified for each price level, the offset that is applied in relation to the quantities associated with the same price are set to '0,' examples of which will be provided below.

1. First Non-Linear Market Depth Example

Figure 8:
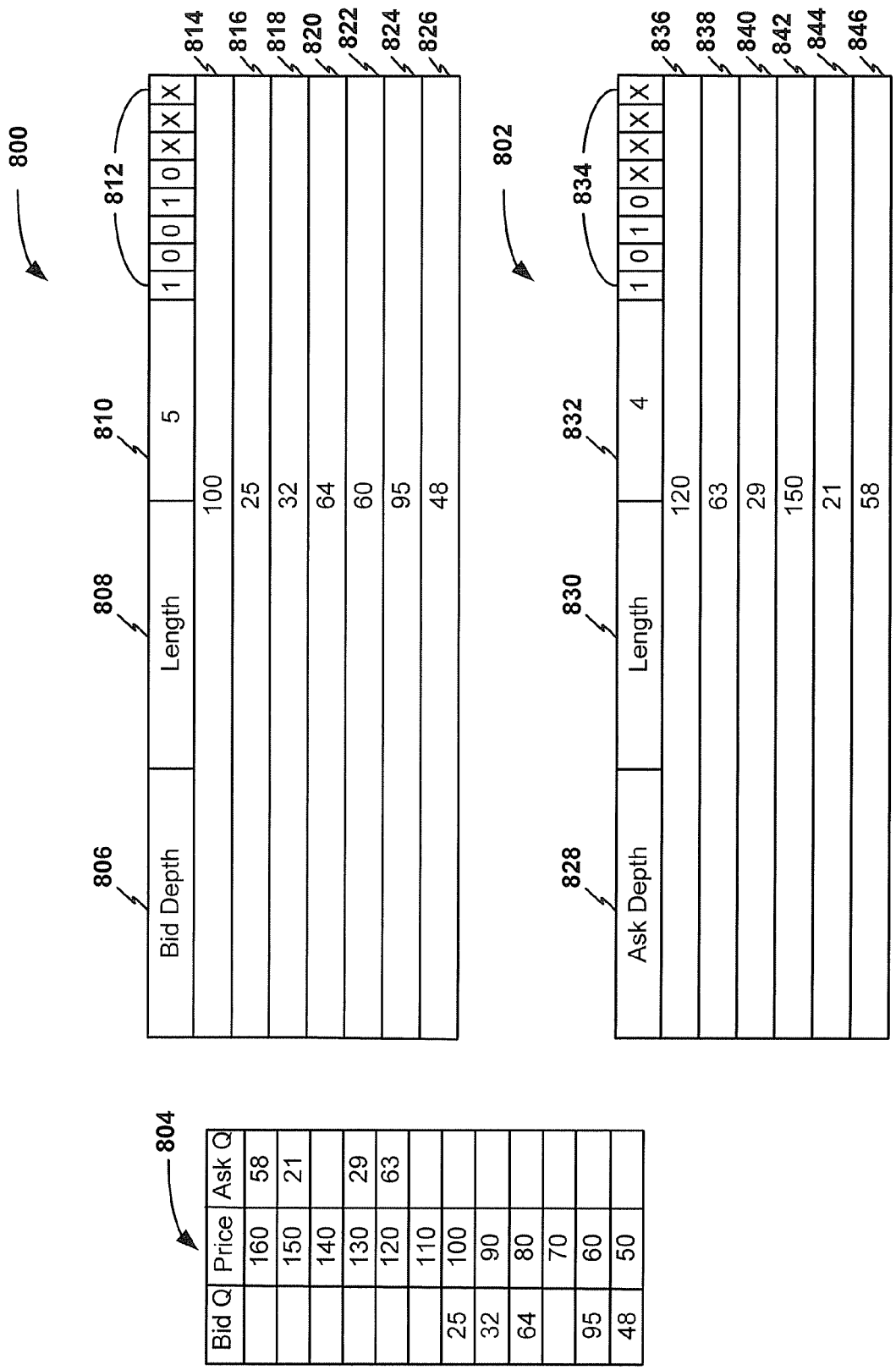
FIG. 8 illustrates an example market depth and message blocks that are used to convey multiple levels of market data using the message block format of FIG. 7.

FIG. 8 illustrates example message blocks 800 and 802 created for a bid side and an ask side of a market depth 804 having fewer than eight price levels on the bid and ask sides. The market depth 804 illustrates a non-linear market on the bid side as well as the ask side. A header of the message block 800 includes a bid depth type 806, a length field 808, a number of bids field 810, and a bitmap 812. The length field 808 defines the length of the message block 800. It should be understood that the length of the message block 800 may depend on whether any compression is used in relation to all or some data specified in the message block 800. The bitmap 812 defines price levels that are sent in the message 800. As shown in the bitmap 812, the best bid of '100' is transferred since the first bit is set to '1.' Then, the next two bid prices are not transferred since they are linear, and the next price of '60' with a pending quantity is non-linear and thus is transferred. The following price of '50' is linear and thus '0' is specified in the bitmap 812.

Now, referring to the message block fields, a first pair of fields 814 and 816 define the best bid price of '100' along with the best bid quantity of '25.' Then, since the next two price levels are linear, block fields 818 and 820 define a quantity of 32 and a quantity of 64 at the two linear price levels. The next block fields 822 and 824 define a non-linear price level of '60' along with a pending quantity of '95.' Finally, since the last price level is linear, the last block field 826 defines a quantity of '48' pending at the next linear price level of '50.'

The message block 802 is used to define an ask depth as shown in a type field 828. The length of the message block 802 is not specified as shown at 830 since the length of the message block 802 may vary depending on whether any compression is used. A size field defines 4 price/quantity levels that are provided in the message block 802, and a bitmap 834 illustrates which prices are specified in block fields of the message block 802. As shown in the bitmap 834, the best ask price is used as a reference price level and is sent in a block field 836, and an additional non-linear price is specified in relation to the third bit, and as shown in a block field 842. All other block fields 838, 840, 844, and 846 define quantity values at each respective price level corresponding to the block fields.

2. Second Non-Linear Market Depth Example

Figure 9:
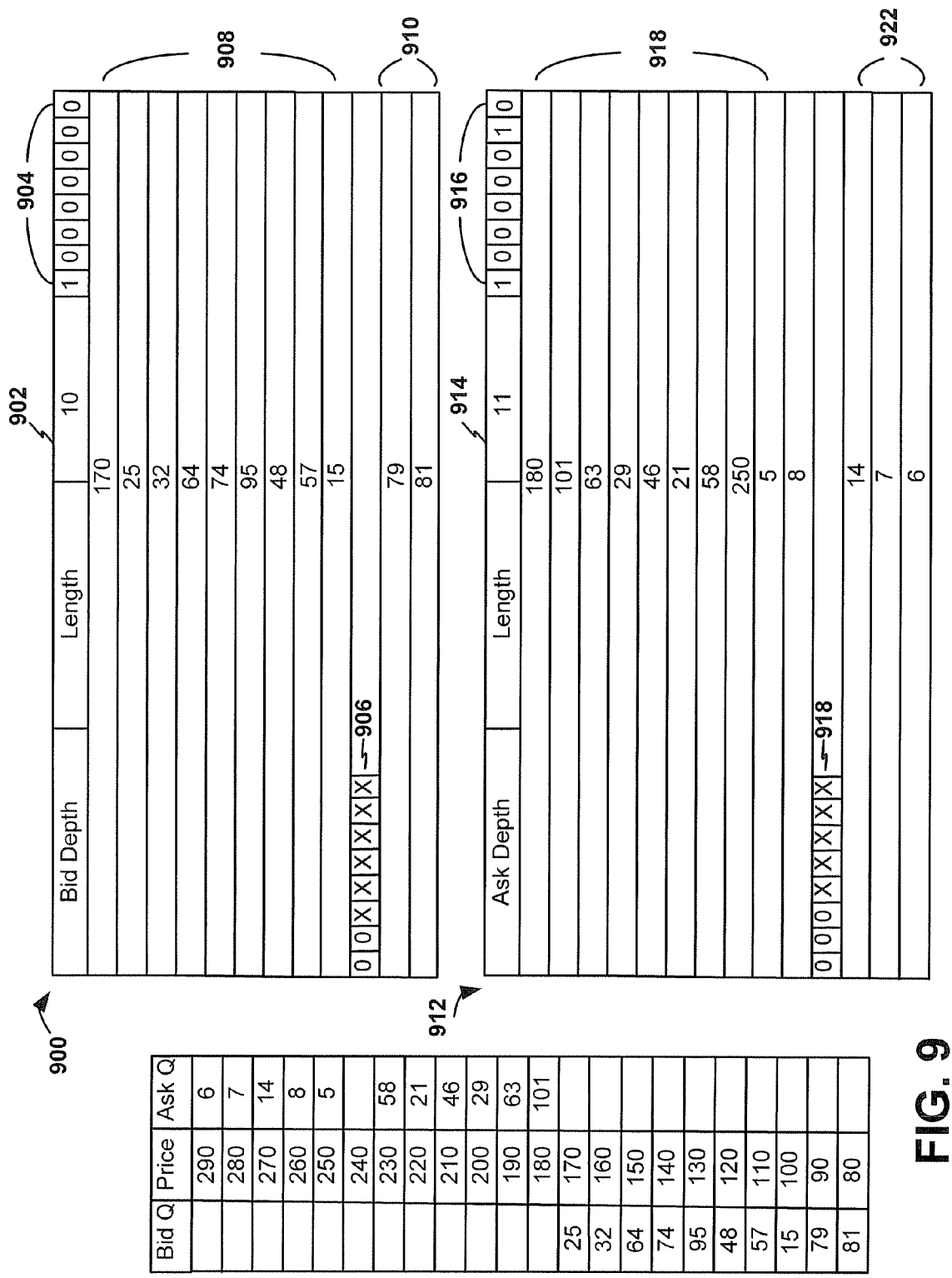
FIG. 9 illustrates another example market depth along with message blocks that are used to convey the illustrated market data using the message block format of FIG. 7.

FIG. 9 illustrates example message blocks 900 and 912 created for a bid side and an ask side of a market depth 904 having more than eight price levels on the bid and ask side of the market. The bid message block 900 is used to transfer 10 depth levels, as shown at 902, and has two bitmaps 904 and 906, with the first bitmap defining which of the first eight bid price levels are transferred, and the second bitmap defining whether any of the additional prices are transferred. As shown in the first bitmap 904, the best bid price level is transferred since the first bit is set to '1.' Then, since the remaining seven price levels are linear, all other bits in the bitmap 904 are set to '0.' The block fields shown at 908 include the best bid price of '170,' with all other fields defining quantities at the eight price levels. Then, the bitmap 906 defines whether any of the two additional bid price levels are transferred. Since the last two bid price levels are linear, only quantities corresponding to the price levels are transferred in block fields 910.

Now, referring to the ask message block 912, there are 11 ask price levels that are transferred in the block 912, as defined at 914. There are two price levels transferred in relation to the first eight price levels, the best ask price and the seventh ask price corresponding to a non-linear price. Thus, the first bitmap 916 includes the first and seventh bits set to '1' The block fields shown at 918 define the transferred prices along with quantities using the format described above. Then, since the last two ask prices are linear, no bits are set to '1' in a bitmap 920, and the quantities corresponding to the linear prices are sent in block fields shown at 922.

3. Individual Order Quantities at Price Levels Example

Figure 10:
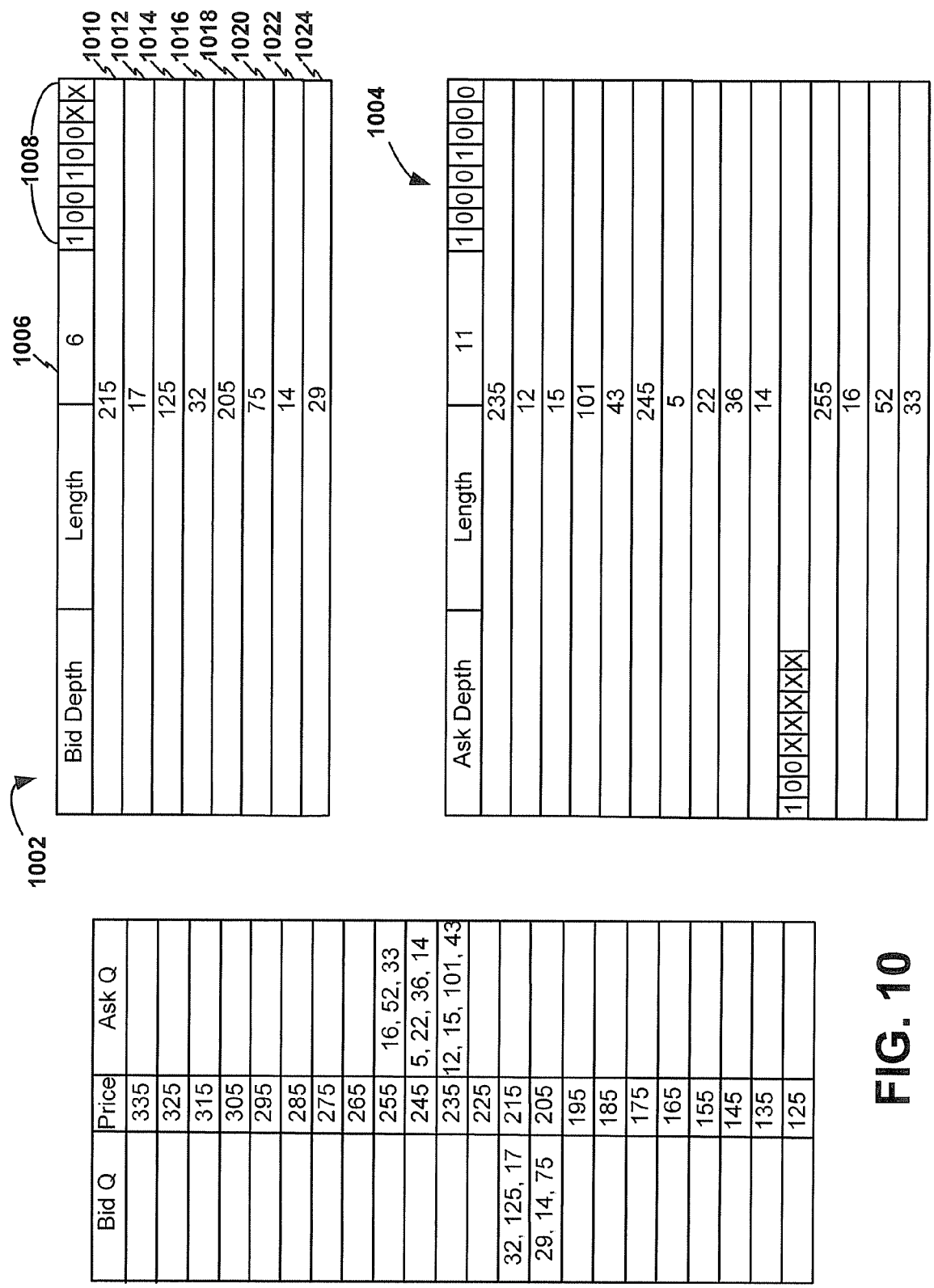
FIG. 10 illustrates an example detailed market depth along with message blocks that are used to convey the illustrated detailed market depth using the message block format of FIG. 7.

FIG. 10 illustrates example message block formats that are used to provide detailed depth at each price level. More specifically, as explained above, rather than providing a single aggregate quantity at each price level, multiple quantity values could be specified for each price if there is more than one order pending at the price level. FIG. 10 illustrates an example market depth 1000 along with two message blocks 1002 and 1004 that are used to represent the bid side and the ask side of the market depth 1000, respectively.

The bid message block 1002 includes header fields that were described above, with a size field 1006 set to '6' since six values are provided in the message 1002. The format of the message 1008 follows the one illustrated in FIG. 7, where a quantity value is specified in a message block field directly after a field that is used to define a price at which the quantity is pending. Thus, because there is more than one field that is used to define quantity values for each price level, a bitmap 1008 is used to specify which block fields list price levels. In the bitmap 1008, the first bit is set to indicate that the best bid price is transferred in a price field 1010. Then, according to the standard message block configuration, the price field 1010 is followed by a quantity field 1012 defining the first quantity value of an order pending at the price best bid price. Then, because the next two fields are used to represent quantities at the same price level rather than a different price, the next two bits in the bitmap 1008 are not set, and the quantities are defined in fields 1014 and 1016. Then, since the next field 1018 is used to define the next price value of '205,' the fourth bit is set in the bitmap 1008. The three message fields 1020-1024 are then used to represent quantities corresponding to individual orders pending at the price level of '205.'

The ask message block 1004 is generated using the same method described in relation to the bid message block 1002. Since there are more than eight values that are represented in the message block 1004, two bitmaps are used to indicate which message fields are used to transfer prices.

IV. Compression

In the examples provided above, each quantity and price value specified in the messages is sent in a binary format. According to one example embodiment, a standard number of bytes, such as 4 bytes, is used to represent each value even if the value could be represented using a smaller number of bytes. Such an embodiment results in the data being sent using more bytes than truly required. This deficiency may be overcome using many different compression schemes that could be applied to quantity values as well as price values provided in the messages.

According to one example embodiment, integer compression may be used to represent quantities and prices in the messages described above. Integer compression refers to a compression method where only a minimal number of bytes is used to represent a given value, with an additional bitmap at either the most significant or least significant bits being used to represent the length of a data string. For example, in the example given above where 4 bytes are used to represent a given value, the first few bits of the first byte may be used to represent the length of a given data string. In such an embodiment, if the first bit is set to '0,' it is assumed that a single byte is used to represent a value. Then, if the first two bits are '1' and '0,' two bytes are used to represent a value, if the first three bits are '1,' '1,' and '0,' three bytes are used, and finally if three first bits are set to '1,' fours bytes are used, etc. As mentioned earlier, different methods to represent the number of bytes being sent for each value could be used as well.

The integer compression results in a significant reduction of the data size in each message. For example, referring back to the example in FIGS. 5A and 5B where a message is generated for a non-linear market, 10 values corresponding to quantities and prices are provided in the message. In an environment where 4 bytes are used to represent each value, the size required to represent 10 values in the message is 44 bytes. Using the proposed integer compression method, since a single byte is sufficient to represent each value in a binary format, only 10 bytes would be needed to represent the same 10 values.

The compression scheme described above may be also combined with a delta method to further reduce the size of data in each message. FIGS. 1A and 1B illustrate an example non-linear market depth 1100 and an example message 1102 generated using a delta method. Similarly to the examples given above, the best ask price '12160' is used as a reference price level. Similarly to the example provided in FIG. 6B, the bid and ask size fields 1104 and 1106 indicate '3' since three bid quantities and three ask quantities are transferred in the message 1102 as shown in message blocks 1112-1122. Then, the ask bitmap shown at 1108 is '1 1 0 0 0,' and a bid bitmap at 1110 is '1 0 1 0 0.'

In the example shown in FIG. 11B, rather than representing all prices at which the market is non-linear, a single reference price is specified, here the lowest ask price of '12160,' in an ask price block 1124, and all other non-linear prices are specified using an offset method. Based on the reference price, the next higher ask price is 2 ticks away from the reference price, and thus '20' is specified in a bid price block 1126 to indicate an offset difference between the reference price and the next non-linear price level. Then, because the next ask price is linear, only a quantity corresponding to the next ask price level, and not the offset value for a price level is specified in the message 1102. Then, as shown in relation to the illustrated depth 1100, the best bid value is 2 ticks away from the best ask price, and thus the offset for the best bid price is specified in a bid price block 1128. Since the next bid price of '12130' is linear as defined in the bitmap 1110, the price is not transferred. Then, the next bid price of '12110' is non-linear and thus an offset value is specified in a block field 1130. While the example illustrated in FIG. 11B shows offset values using the actual price difference, it should be understood that offsets could be defined using a single digit value specifying a tick level difference.

As explained earlier, the prices and quantities defined in the message 1102 may be compressed using the integer compression method or yet some other method. In the embodiment illustrated in FIG. 11B, the value '12160' is represented using 2 bytes. If all other price levels were to be represented using the actual values, each price level would be represented using 2 bytes, thus, resulting in 8 bytes representing four price levels. However, since only one reference price is specified using the actual price level value, and three other prices are represented using offset values, the offset values are small enough so that they can be represented using a single byte. Thus, using the integer encoding in combination with the delta method of sending non-linear prices, the message size is reduced by 3 bytes with respect to the illustrated price levels. As the number of price levels increase, the savings increase as well.

While not specifically illustrated in the messages shown above, it should be understood that quantities in each message could be represented using a delta method to further reduce the message size when compression methods are used. Those skilled in the art will understand that many different variations of the message formats are possible as well.

V. Various Other Market Data Message Formats

In addition to providing market depth related data, there are other data types that are normally provided to client terminals in an electronic trading environment. Some example data types along with example messages will be described below. It should be understood that compression methods described above could also be used in relation to data provided in the messages below.

A. Trade Data

Figure 12:
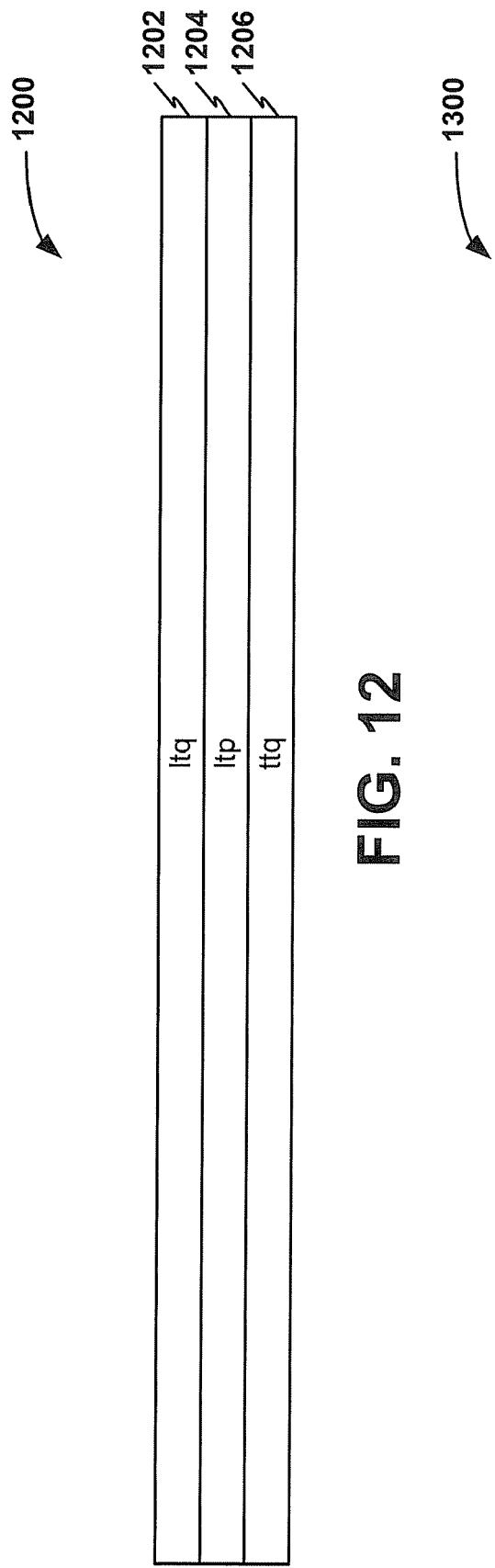
FIG. 12 is a block diagram illustrating an example message that is used to send trade data to client terminals.

FIG. 12 is a block diagram illustrating an example message 1200 that may be used to send trade data to client terminals. The message 1200 includes a last traded quantity ('ltq') field 1202, a last traded price ('ltp') field 1204, and a total traded quantity ('ttq') field 1206. While not shown, the message 800 may include a block header in addition to the illustrated fields.

B. Session Data

Figure 13:
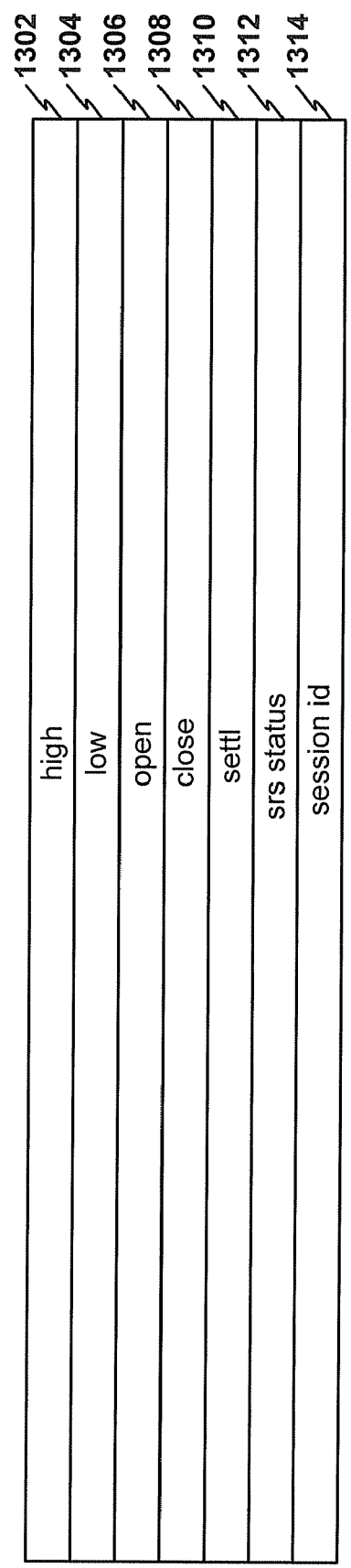
FIG. 13 is a block diagram illustrating an example message that is used to send session data to client terminals.

FIG. 13 is a block diagram illustrating an example message 1300 that may be used to send session data to client terminals. The message 1300 may be sent to notify clients of updates to session prices and other information. Similarly to the message illustrated in FIG. 12, the message 1300 includes a block header. Message fields illustrated in FIG. 13 include five price related fields 1302-1310 that define a session high price, a session low price, a session open price, a session close price, and a session settlement price, respectively. Then, field 1312 defines a current status of a tradeable object, and field 1314 defines a session identifier, such as a 32-bit identifier created to identify the current trading session.

While a few additional messages have been illustrated, it should be understood that many different messages could be used to convey additional market related data.

Although the example programs, processes and methods have been described and illustrated in detail, it is clearly understood that the same is by way of illustration and example only and is not to be taken by way of limitation. Since numerous modifications and changes will readily occur to those skilled in the art, it is not desired to limit the invention to the exact construction and operation shown and described, and accordingly, all suitable modifications and equivalents may be resorted to, falling within the scope of the invention.

According to one embodiment, the example system takes the form of a computer program product that is stored on a computer readable storage medium and is executed by a suitable instruction execution system in the computer-based device. The term computer readable medium, as used herein, refers to any medium that participates in providing instructions to processor for execution. Such a medium may take many forms, including but not limited to, non-volatile media, volatile media, and transmission media. Nonvolatile media includes, for example, optical or magnetic disks, such as storage device. Volatile media includes dynamic memory, such as main memory or RAM (random access memory). Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, and any other memory chip or cartridge, or any other medium from which a computer can read.

According to an alternative embodiment, a hardware embodiment might take a variety of different forms. A hardware embodiment may be implemented as an integrated circuit with custom gate arrays or an application specific integrated circuit ("ASIC"). A hardware embodiment may also be implemented with discrete hardware components and circuitry. In particular, it is understood that the logic structures and method step described in the flow diagrams may be implemented in dedicated hardware such as an ASIC, or as program instructions carried out by a microprocessor or other computing device. It will be apparent to those of ordinary skill in the art that the methods described above may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

What is claimed:

1. A method for providing market data in an electronic trading environment, comprising:

receiving market information for a tradeable object being traded at an electronic exchange, the market information comprising a plurality of price levels and a plurality of order quantities, wherein each price level of the plurality of price levels is associated with at least one trade order pending at the electronic exchange to buy or sell an order quantity for the tradeable object;

determining by a computer device that the plurality of price levels includes a linear price level and a non-linear price level, wherein the non-linear price level is separated by more than one default tick increment from a preceding price level of the plurality of price levels;

generating by the computer device an indicator sequence comprising a plurality of fields to represent the plurality of price levels, wherein each of the plurality of fields provides an indicator that indicates whether the corresponding price level is linear or non-linear;

generating by the computer device a price feed message comprising the indicator sequence, the plurality of order quantities, and the non-linear price level, wherein the linear price level is not provided in the price feed message; and sending the price feed message to a receiving terminal.

2. The method of claim 1, wherein the market information comprises an inside market with a current highest bid price level and a current lowest ask price level, the method further comprising:

using the current highest bid price level or the current lowest ask price level as a reference price level, wherein the price feed message further comprises the reference price level.

3. The method of claim 1, wherein the plurality of order quantities comprises an aggregate quantity of one or more orders at each of the plurality of price levels.

4. The method of claim 1, wherein the plurality of order quantities comprises one or more individual order quantities at each of the plurality of price levels.

5. The method of claim 1, further comprising:
generating a first indicator sequence for a plurality of bid price levels in the plurality of price levels; and
generating a second indicator sequence for a plurality of ask price levels in the plurality of price levels.

6. The method of claim 1, wherein the indicator sequence comprises a bitmap having a plurality of bit fields, wherein the indicator is a single bit indicator.

7. The method of claim 1, further comprising:
receiving the price feed message at the receiving terminal; and
using the indicator sequence at the receiving terminal to map the plurality of order quantities to the plurality of price levels.

8. The method of claim 1, further comprising:
sending the price feed message to a gateway.

9. The method of claim 1, wherein the plurality of price levels comprises a plurality of direct price levels, and wherein the plurality of order quantities comprises a plurality of direct order quantities.

10. The method of claim 1, wherein the plurality of price levels comprises a plurality of implied price levels, and the plurality of order quantities comprises a plurality of implied order quantities.

11. The method of claim 1, further comprising:
using a compression algorithm to compress values in the price feed message that represent the plurality of order quantities.

12. The method of claim 11, wherein the compression algorithm comprises an integer compression algorithm.

13. The method of claim 11, further comprising:
providing at least one byte to represent each of the plurality of order quantities;
using at least one bit of a first byte of the at least one byte to represent how many bytes are used to represent each of the plurality of order quantities.

14. The method of claim 2, further comprising:
using a compression algorithm to compress a value of the reference price level.

15. The method of claim 1, further comprising:
defining an offset value for at least one of the plurality of order quantities at one of the plurality of price levels, the offset value defining a change in the at least one order quantity as compared to a quantity at the one of the plurality of price levels provided in a previous price feed message.

16. The method of claim 1, wherein the price feed message is generated at an electronic exchange.

17. The method of claim 1, wherein a price level corresponding to the non-linear price level is higher than the preceding price level.

18. The method of claim 1, wherein a price level corresponding to the non-linear price level is lower than the preceding price level.

19. A non-transitory computer readable medium having stored therein instructions executable by a processor, wherein the instructions are executable to:
receive market information for a tradeable object being traded at an electronic exchange, the market information comprising a plurality of price levels and a plurality of order quantities, wherein each price level of the plurality of price levels is associated with at least one trade order pending at the electronic exchange to buy or sell an order quantity for the tradeable object;
determine by a computer device that the plurality of price levels includes a linear price level and a non-linear price level;
generate by the computer device an indicator sequence comprising a plurality of fields to represent the plurality of price levels, wherein each of the plurality of fields provides an indicator that indicates whether the corresponding price level is linear or non-linear, wherein the non-linear price level is separated by more than one default tick increment from a preceding price level of the plurality of price levels;
generate by the computer device a price feed message comprising the indicator sequence, the plurality of order quantities, and the non-linear price level, wherein the linear price level is not provided in the price feed message; and
send the price feed message to a receiving terminal.

20. The non-transitory computer readable medium of claim 19, wherein the price level corresponding to the non-linear price level is higher than the preceding price level.

21. The non-transitory computer readable medium of claim 19, wherein the price level corresponding to the non-linear price level is lower than the preceding price level.

* * * * *